United States Patent [19]

Desplanches et al.

[11] 4,137,287

[45] Jan. 30, 1979

[54] METHOD OF PREPARING BETA ALKALINE ALUMINA PARTS

[75] Inventors: Gérard Desplanches, Villejust; Yvon Lazennec, St. Michel sur Orge; Jacques Leboucq, Ste. Genevieve des Bois, all of France

[73] Assignee: Compagnie Generale d'Electricite S.A., Paris, France

[21] Appl. No.: 741,081

[22] Filed: Nov. 11, 1976

[30] Foreign Application Priority Data

Nov. 26, 1975 [FR] France .................................. 75 36169

[51] Int. Cl.$^2$ ............................................ C04B 35/10
[52] U.S. Cl. .......................................... 264/62; 264/65; 429/191; 429/193
[58] Field of Search ............................. 264/61, 62, 65; 429/191, 193

[56] References Cited

U.S. PATENT DOCUMENTS

| 3,520,054 | 7/1970 | Pensack et al. | 264/61 |
| 3,625,773 | 12/1971 | Charles et al. | 264/65 |
| 4,056,589 | 11/1977 | Lingscheit | 264/65 |
| 4,068,048 | 1/1978 | Desplanches et al. | 264/65 |

*Primary Examiner*—Robert F. White
*Assistant Examiner*—John A. Parrish
*Attorney, Agent, or Firm*—Sughrue, Rothwell, Mion, Zinn and Macpeak

[57] ABSTRACT

The invention relates to a method of preparing beta alkaline alumina parts particularly for use as solid electrolytes in electric cells of the sodium-sulphur type. It consists in mixing alumina and an alkaline carbonate in predetermined quantities, heating the mixture, crushing after cooling, forming the parts, sintering them and, after said forming, but prior to sintering depositing a layer of a compound of said alkaline metal on the surface of the parts in contact with the atmosphere to create an atmosphere rich in sodium in the immediate vicinity of the parts during sintering for compensating any loss of the element which may occur from the parts and minimizing the loss of alkaline metal by diffusion towards the outside of the parts.

12 Claims, No Drawings

METHOD OF PREPARING BETA ALKALINE ALUMINA PARTS

FIELD OF THE INVENTION

The present invention relates to a method of preparing beta alkaline alumina parts and in particular beta sodium alumina parts.

BACKGROUND OF THE INVENTION

It is known that there are at present wide applications for beta alkaline alumina and in particular beta sodium alumina as solid electrolytes in electric cells such as sodium-sulphur cells.

In known methods for preparing such parts, there is a disadvantage due to the fact that during sintering, there is a great loss of alkaline metal, this leading more especially to non-uniformity of the properties of the parts between different sintering batches.

Circumstances therefore lead to sintering in enclosures such as the type described by the applicant U.S. Pat. No. 4,068,048, entitled "A method of preparing alkaline beta alumina parts".

Preferred embodiments of the present invention make it possible to overcome such disadvantages and it relates to a method enabling easy preparation of beta alkaline alumina parts and in particular of beta sodium alumina parts having compositions and properties which are reproducible. The method is simple to implement and has a moderate production cost.

The present invention provides a method of preparing beta alkaline alumina parts which comprises the following successive stages:

A. an intimate mixture of alumina and alkaline carbonate powders is made in quantities such that a predetermined ratio of alumina to alcaline carbonate is obtained, B. said intimate mixture is heated in an open crucible, C. said mixture is allowed to cool freely, D. the powder thus obtained is crushed, E. said parts are then formed, and F. the parts are sintered, wherein after said forming, and prior to sintering, a layer of a compound of said alkaline metal is deposited on the surface of the parts in contact with the atmosphere.

The alkaline carbonate is preferably sodium carbonate.

Particular embodiments of the invention are described by way of example having no limiting character. Initially, alpha alumina or gamma alumina powders are intimately mixed with sodium carbonate powder in such quantities that a ratio of $xAl_2O_3$ to $Na_2O$ is obtained, where $x$ lies between 5 and 11.

Such a mixture is disposed in an open crucible so that the reaction takes place in an unconfined atmosphere.

Said crucible is placed in a furnace and heated to a temperature lying between 1150° and 1300° C. maintained at that temperature for 1 to 5 hours for example.

At the end of the heating period, the crucible is allowed to cool freely.

The beta sodium alumina thus obtained in powder form is then crushed for about 30 minutes and sifted.

The parts are then formed, e.g. into tubes by any appropriate means such as pressing, slip casting, depositing by electrophoresis or by spraying with a spray gun on a mandrel after the powder has been suspended in an organic solvent which may contain a binding agent, the deposition being followed by isostatic compression.

A compound of the same alkaline metal as that used in the composition of the part, such a compound possibly being a carbonate, an aluminate, an alkaline nitrate, in this case of sodium, is deposited on those surfaces of the parts which are in contact with the atmosphere.

For this purpose, a solution or suspension in water or alcohol or acetone or any other substance containing 3% to 35% by weight of one of said compounds or a mixture thereof, is prepared and the parts are dipped in this solution or suspension. This solution can also be sprayed on said parts with a spray gun.

The parts are then sintered in a suitable furnace.

For this purpose, the parts are heated to a temperature of 1550° C. to 1700° C. which is maintained for 5 minutes to 4 hours. The temperature rise time lies between 10 minutes and 3 hours. Then the furnace is allowed to cool down to ambient temperature.

A preferred embodiment of the invention is now described. Powders of alpha alumina and sodium carbonate are mixed in such quantities that a ratio of $xAl_2O_3$ to $Na_2O$ is obtained where $x$ is equal to 6.

The mixture is disposed in the crucible and is heated to a temperature of 1200° C. which is maintained for 3 hours.

After the crucible has cooled, the beta sodium alumina obtained in powder form is crushed for 30 minutes then sifted. Tubes which are 70 mm long with an exterior diameter of 10.4 mm and an interior diameter of 8 mm are produced by electrophoresis on a mandrel after the powder has been suspended in alcohol.

An aqueous solution containing 200 g of sodium carbonate per liter is then prepared and the parts are then dipped in this solution.

Then, the parts undergo isostatic compression. They are then sintered at a temperature of 1650° C. maintained for 1 hour and 30 minutes. The furnace is then allowed to cool down to ambient temperature. The parts obtained have a length of 61 mm, an exterior diameter of 9 mm and an interior diameter of 7 mm.

Some advantages of this method are as follows:

In the first instance, the provision of layers of sodium carbonate, in particular on the parts themselves enables the creation of an atmosphere rich in sodium in the immediate vicinity of the parts suitable for compensating any loss of this element which may occur from the parts.

Further, such layers form a fluid-tight film on the surface and through a fraction of the thickness of the parts thereby minimizing their sodium losses by diffusion towards the outside.

Of course, the invention is in no way limited to the embodiments described, but on the contrary, it covers all the embodiments thereof as defined by the claims.

What we claim is:

1. A method of preparing beta alkaline alumina parts which comprises the following successive stages:

A. intimately mixing alumina and alkaline carbonate powders in quantities such that a predetermined ratio of alumina to alkaline carbonate is obtained;

B. heating said initiate mixture in an open crucible;

C. cooling said mixture freely;

D. crushing the powder thus obtained;

E. forming said parts; and

F. sintering the parts;

the improvement wherein after said forming and before sintering, depositing a layer of a compound of said alkaline metal on the surface of the parts in contact with the atmosphere;

whereby, an atmosphere rich in alkaline metal is created in the immediate vicinity of the parts during sintering for compensating any loss of alkaline metal which may occur from the parts while minimizing alkaline metal losses by diffusion of the alkaline metal towards the outside of the parts.

2. A method according to claim 1 wherein the alcaline carbonate is sodium carbonate.

3. A method according to claim 1, wherein the layer of compound is deposited by dipping the parts in a solution or a suspension of said compound in a liquid medium.

4. A method according to claim 1, wherein the layer of compound is deposited by spraying with a spray gun of a solution or suspension of said compound in a liquid medium on the parts.

5. A method according to claim 3, wherein said solution or suspension contains 30 to 350 g of said compound per liter.

6. A method according to claim 1, wherein said compound is chosen from the group consisting of a carbonate, an aluminate and a nitrate.

7. A method according to claim 1, wherein said liquid medium is chosen from the group consisting of water, alcohol and acetone and a mixture thereof.

8. A method according to claim 1, wherein during stage E the parts are formed by depositing powder on a mandrel and subjecting the powder to isostatic compression, and wherein said isostatic compression step is effected after deposition of the compound of the alkaline metal on the parts.

9. A method according to claim 1, wherein the parts are sintered by heating to a temperature lying between 1550° C. and 1700° C. and maintained for a duration of 5 minutes to 4 hours, and are allowed to cool down to ambient temperature.

10. A method according to claim 1, wherein said ratio of alumina to alkaline carbonate lies between 5 and 11.

11. A method according to claim 1, wherein during stage B, the parts are heated to a temperature lying between 1150° C. and 1300° C. and maintained for a duration of 1 to 5 hours.

12. A method according to claim 1, wherein said beta alkaline alumina is beta sodium alumina.

* * * * *